6313X
Sheet 1. 3 Sheets.
J. Jewett.
Cloth Stretching and Napping Mach.
Patented Dec. 30, 1830.
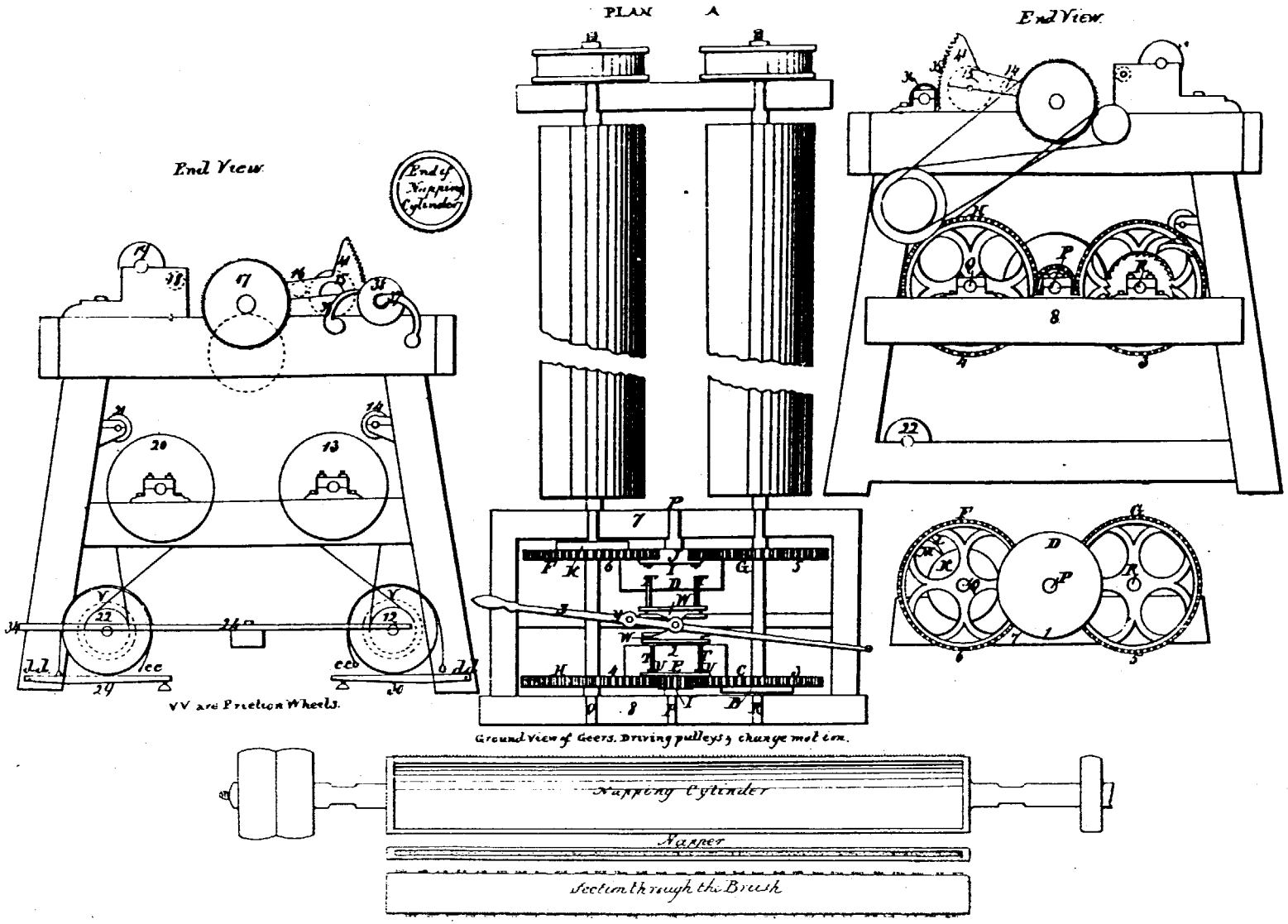
N. PETERS, PHOTO-LITHOGRAPHER WASHINGTON, D. C.

6313X
Sheet 2 - 3 Sheets.
J. Jewett.
Cloth Stretching and Napping Mach.
Patented Dec. 30, 1830.
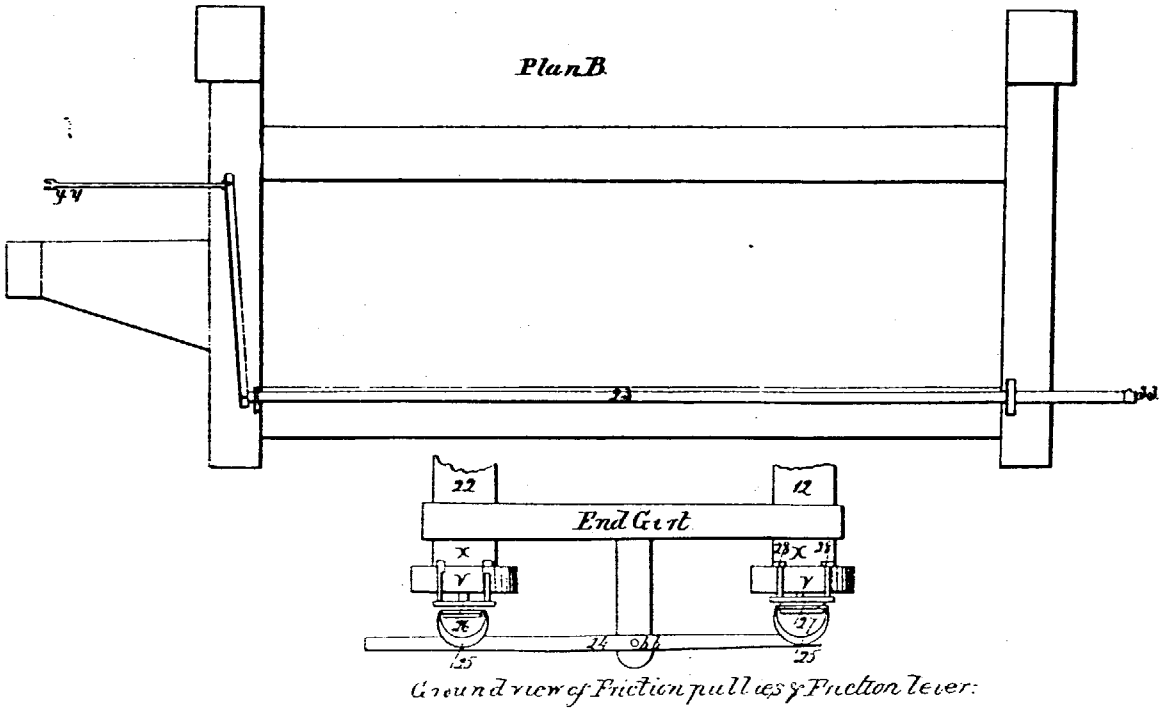
H. PETERS, PHOTO-LIT. LITHOGRAPHER, WASHINGTON, D. C.

6313X
Sheet 3 - 3 Sheets.
J. Jewett.
Cloth Stretching and Napping Mach.
Patented Dec. 30, 1830.
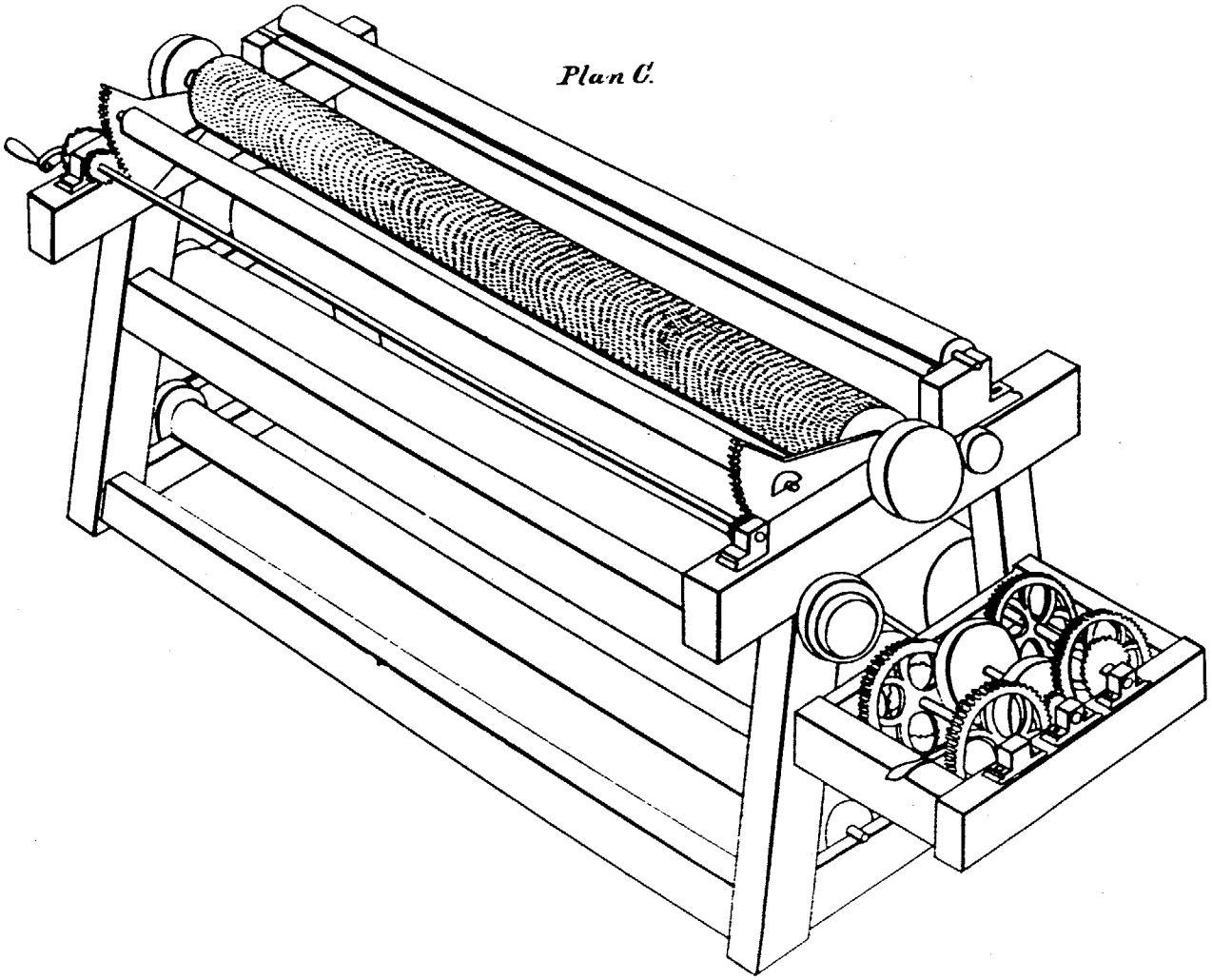
Plan C.

John Jewett. Dudley Mass.
X 6313

Letters Patent

The Schedule referred to in these Letters Patent. and making part
of the same containing a description in the words of the said John Jewett
himself of his improvement in the mode of causing cloth to pass and be
stretched whilst passing over a revolving cylinder prepared with points or
teeths for teasing or raising the pile or nap upon cloth.

To all to whom these presents shall come. I John Jewett of
Dudley in the County of Worcester and State of Massachusetts send
Greeting — Be it known that I the said Jewett have invented
[illegible] made and applied to use a new and useful improvement
in the mode of causing cloth to pass and be stretched whilst passing over
a revolving Cylinder prepared with points or teeths for teasing or raising
the pile or Nap upon cloth. which invention and the principle there
of and the manner in which I have contemplated the application thereof
and the mode of using the same are explained and described as follows
that is to say. the cloth to be teased is to be wound on a revolving cloth
beam and from that made to pass over and under rollers and over the
revolving cylinder prepared for teasing it and over and under rollers
on to another revolving cloth beam on which it is to be wound up as
it comes off from the first beam after having passed over and under
the rollers and cylinder aforesaid and then by a change of motion
after it has been unwound from the first beam it may be made
to pass back over and under the rollers and cylinder aforesaid
and again wound upon the first beam as it comes off from the beam
on which it was last wound up. the motion of the cloth beams and
rollers being governed regulated and changed in the manner herein after
described and explained. which description and explanation may
be better understood by reference to the plan hereto annexed.
The cloth being wound on the cloth beam numbered twelve in plan A.

[illegible]

is made to pass over the carrying roller numbered fourteen and thence
under the feeding roller numbered thirteen and thence over the stretching
roller numbered fifteen and thence under the metallic Roller numbered
sixteen and thence over the cylinder for teasing it numbered seventeen
and thence under another metallic Roller numbered eighteen and thence
over a stretching Roller numbered nineteen and thence under a feeding
Roller numbered twenty and thence over a carrying roller numbered
twenty one and thence on to the cloth beam numbered twenty two
upon which it is wound up when the machine is in motion as it
[illegible] as aforesaid from the cloth beam numbered twelve aforesaid
and from which cloth beam numbered twenty two it may by a change
of motion herein described be made to pass back and be wound up
again on the cloth beam numbered twelve. The cloth beams are num
bered twelve and twenty two in plan A and have pulleys of the same
diameter of the beams on the ends thereof and fastened to the same
shaft by which the beams are moved, which pulleys are represent
ed by XX. In the plan B these pulleys are connected with
pulleys upon their respective feeding rollers numbered thirteen
and twenty in plan A. by means of cross belts running over
the pulleys and also over pulleys at the ends of the respective fee
ding rollers and fixed to their shafts, which pulleys are of the
same diameter as the feeding Rollers respectively by which means
motion is communicated from the feeding Rollers to the cloth
beams. Rollers numbered fourteen and twenty one in the plan
A are isolated revolving rollers called carrying Rollers and are
moved by the friction of the cloth passing on them. Rollers num
bered thirteen and twenty in plan A are rollers moved by gearing
called feeding Rollers which draw the cloth and stretch it as it pas
ses on. Roller numbered fifteen in the same plan is a revolv
ing isolated roller moved only by the cloth capable of being elevated or
depressed to loose or raise the cloth and graduate its friction upon the
points or teazles on the cylinder prepared for teazing it. Roller num
bered nineteen is an isolated Roller and moves only by the fric
tion.

X 6313 of the cloth passing over it called a stretching roller. Rollers number
ed sixteen and eighteen are metallic [illegible] rollers to be made of iron
or any other metal sufficiently stiff and strong moved only by the fric
tion of the cloth and intended to keep the cloth smooth until it reach
es the points or teazles on the cylinders prepared for teazing it. Num
ber seventeen is the Cylinder prepared with points or teazles for rais
ing the pile or nap on cloth. H, F, C, & G in plan A are gear
wheels. H + G being each one twentieth larger in circumference than
F + C. The gear wheels H + G are fixed to their respective shafts
immoveably and revolve with and turn them. F + C are not always
so fixed but move upon their respective shafts when revolving in one
direction and become fixed when revolving in an opposite direction
and brought so that the catches upon and connected with them re
spectively catch into the circular ratchets fixed to their respective
shafts Q + R. K + B. are circular ratchets fixed to their respec
tive shafts Q + R for the purpose of holding the gear wheels F + C.
when revolving and brought so that their catches can catch into
the teeth of the ratchets L + M on a spring and catch connect
ed to the gear wheels F and the ratchet K into which the catch
catches when the gear wheel is turned in such direction and brought
so that the catch comes into the teeth of the ratchet so as to hold
the wheel. There is a similar spring and catch on the gear wheel
C which catches into the ratchet B in like manner and for
like purposes. S is a lever called a shipping lever used to put in
and out of gear the gear wheels F + G alternately and also to put
in and out of gear the friction wheels V + V on shafts of the cloth
beams on the outside of the pulleys marked X + X on shafts of
the cloth beams numbered twelve and twenty two. P is the shaft
on which pinions I + J. revolve the shaft is stationary and is
bent in the middle so as to bring each end in the centre of the
respective pinions I + J. I & J are pinion wheels with a
flange connected with catches U, U, U, U. and not confined
but loose on the shaft and gear respectively into the respective gear wheels F & G. H & C. D & E are pulleys loose on the shaft
P. and moved contrary ways by belts, one being an open and the
other a cross belt for the purpose of changing the motion of the cloth
T.T.T.T are dogs which pass through the pulleys D & E respective
ly and revolve with them and by means of the shipping lever
may be brought so as to be held fast by the catches U.U.U.U on
the flanges of the pinions I & J. when it is required to change
the motion of the cloth rollers a new motion being given to the
pinions I & J respectively by being thus connected with the
respective pulleys D & E which are always moving with the
same velocity in a contrary direction to each other. Lever S.
turns on a pivot Y and is connected with forks W & W. which
are adjusted to the necks of the flanges in which are the dogs
T.T.T.T so that the flanges may revolve while the forks remain
stationary and so that the forks being adjusted to the necks
of the flanges may by a motion of the lever move the dogs T.T.T.T.
so as bring them in contact with, or remove them from the catch
es U.U.U.U. as may be required. Lever. S. extends to the opposite
side of the frame and the end marked O in plan A is connected
with rod X.X. in plan B which is attached to a perpendicular
lever Z which turns upon the pivot A.A. and is made to act
by motion of the lever S on a horizontal slide numbered twenty
three running parallel with the opposite side of the frame and the
slide numbered twenty three in the plan B is connected with a
lever numbered twenty four which is opposite and parallel to lever
S and turns on a pivot B.B in the centre between the cloth beams
numbered twelve and twenty two. So that when lever S is moved
it operates on lever numbered twenty four. Twenty five and twen
ty five on plan B are forks attached to lever numbered twen
ty four, and bayonets or slides numbered twenty six and twenty
seven in such manner as when lever 24 is moved in one direction
it throws the bayonet or slide numbered twenty seven in contact
with dogs 28 and carry the friction pulley V to act on cloth.

gear wheels F & G. H & C. D & E are pulleys loose on the shaft
P. and moved contrary ways by belts. one being an open and the
other a cross belt for the purpose of changing the motion of the cloth
T.T.T.T are dogs which pass through the pulleys D[illegible] respective
ly and revolve with them and by means of the shipping lever
may be brought so as to be held fast by the catches U.U.U.U on
the flanges of the pinions I & J. when it is required to change
the motion of the cloth roller a new motion being given to the
pinions I & J respectively by being thus connected with the
respective pulleys D & E which are always moving with the
same velocity in a contrary direction to each other. Lever S.
turns on a pivot Y and is connected with forks W & W. which
are adjusted to the necks of the flanges in which are the dogs
T.T.T.T so that the flanges may revolve while the forks remain
stationary and so that the forks being adjusted to the necks
of the flanges may by a motion of the lever move the dogs T.T.T.T.
so as bring them in contact with, or remove them from the catch
es U.U.U.U. as may be required. Lever. S. extends to the opposite
side of the frame, and the end marked O in plan A is connected
with rod Y.Y. in plan B which is attached to a perpendicular
lever Z which turns upon the pivot A A and is made to act
by motion of the lever S on a horizontal slide numbered twenty
three running parallel with the opposite side of the frame and the
slide numbered twenty three in the plan B is connected with a
lever numbered twenty four which is opposite and parallel to lever
S and turns on a pivot B.B in the centre between the cloth beams
numbered twelve and twenty two. so that when lever S is moved
it operates on lever numbered twenty four. Twenty five and twen
ty five on plan B are forks attached to lever numbered twen
ty four. and bayonets or slides numbered twenty six and twenty
seven in such manner as when lever 24 is moved in one direction
it throws the bayonet or slide numbered twenty seven in contac
with dogs 28 and carry the friction pulley V to act on cloth.

XG313 tion a communication of motion to lever numbered twenty four. the friction
pulley V is made to act on the cloth beam numbered twenty two. Moreover B so
as to bring the dogs T T in contact with the catches on pinion wheel J on the
opposite side and the opposite motion will take place both with respect to the
gear wheels ... rollers and cloth beams. When the machine is in motion and
the cloth is passing from the cloth beam numbered twelve under the feeding roller
numbered thirteen and so on in the manner before described to the cloth beam
numbered twenty two the friction pulley V is acting on the cloth beam numbered
twelve for the purpose of preventing the cloth from going off too fast, and the
feeding roller numbered twenty moves with a velocity one twentieth great
er than the feeding roller numbered thirteen by reason of the inequality in size
of the gear wheels F & G in order to draw the cloth tight and smooth over the
cylinder prepared for teasing it and the cloth beam numbered twenty two
is moved so as to wind up the cloth by motion communicated from a pulley
on the shaft of the feeding roller numbered twenty. by means of a belt which
will slip so as to accommodate the velocity of the cloth beam to its varying
circumstances by means of the winding of the cloth upon it. When the cloth
is passing from the cloth beam numbered twenty two under the feeding roll
er numbered twenty and so in the manner described to the cloth beam num
bered twelve the pulley V is acting on the cloth beam numbered twenty
two for the purpose of preventing the cloth from going off too fast and the
feeding roller numbered thirteen moves with a velocity one twentieth
greater than the feeding roller numbered twenty by reason of the inequality
in size of the gear wheels H & C in order to draw the cloth tight and smooth
as aforesaid and the cloth beam numbered twelve is moved so as to wind
up the cloth by motion communicated from a pulley on the shaft of the
feeding roller numbered thirteen by means of a belt which will slip
so as to accommodate the velocity of the cloth beam as aforesaid. It
is to be understood nevertheless that although I have in my plans and
the explanation thereof mentioned a cylinder prepared with points or
teazles for teazing cloth. yet I do not claim as a part of my inven
tion such cylinder either separately or in combination nor the raising
of nap on cloth by means thereof and although I have mentioned stretch ing

X6313 rollers numbered fifteen and nineteen in my plan A which ought to be the stretching rollers now used for stretching the cloth widthwise. yet I do not claim the same either separately or in combination as a part of my invention nor the stretching of cloth widthwise. and as to the rest of the machinery described none of it is claimed separately and only so much of it in combination as is adapted to give motion to and regulate and change the motion of the feeding rollers numbered thirteen and twenty in my plan A so as to regulate and change alternately the motion of the cloth and draw it tight and smooth over the cylinder prepared for raising the nap ~~[illegible]~~ — In Witness whereof I the said John Jewett have hereunto set my hand and seal this seventh — day of December in the year of our Lord Eighteen Hundred and thirty Witnesses
E. P. Whitman
B^n Rand John Jewett (L.S.)

Ex^d.
C.A.W.

2888 [illegible]

(Patented December 30. 1830)